(12) United States Patent
Olkkonen et al.

(10) Patent No.: US 10,379,358 B2
(45) Date of Patent: Aug. 13, 2019

(54) OPTICAL SEE-THROUGH DISPLAY ELEMENT AND DEVICE UTILIZING SUCH ELEMENT

(71) Applicant: Dispelix Oy, Espoo (FI)

(72) Inventors: Juuso Olkkonen, Espoo (FI); Antti Sunnari, Espoo (FI)

(73) Assignee: Despelix Oy, Espoo (FI)

( * ) Notice: Subject to any disclaimer, the term of this patent is extended or adjusted under 35 U.S.C. 154(b) by 0 days.

(21) Appl. No.: 15/561,537

(22) PCT Filed: Apr. 8, 2016

(86) PCT No.: PCT/FI2016/050229
§ 371 (c)(1),
(2) Date: Sep. 26, 2017

(87) PCT Pub. No.: WO2016/162606
PCT Pub. Date: Oct. 13, 2016

(65) Prior Publication Data
US 2018/0081176 A1    Mar. 22, 2018

(30) Foreign Application Priority Data

Apr. 8, 2015   (FI) .................................. 20155254

(51) Int. Cl.
| | |
|---|---|
| *G02B 5/18* | (2006.01) |
| *G02B 27/01* | (2006.01) |
| *G02B 6/00* | (2006.01) |
| *F21V 8/00* | (2006.01) |
| *G02B 27/00* | (2006.01) |

(52) U.S. Cl.
CPC ....... *G02B 27/0172* (2013.01); *G02B 5/1814* (2013.01); *G02B 5/1823* (2013.01);
(Continued)

(58) Field of Classification Search
CPC .............. G02B 5/18; G02B 2005/1804; G02B 5/1814; G02B 5/1819; G02B 5/1823;
(Continued)

(56) References Cited

U.S. PATENT DOCUMENTS

| | | | |
|---|---|---|---|
| 4,856,869 A | 8/1989 | Sakata et al. | |
| 7,206,107 B2 * | 4/2007 | Levola | G02B 27/0081 359/15 |

(Continued)

FOREIGN PATENT DOCUMENTS

| | | |
|---|---|---|
| JP | 2006350129 A | 12/2006 |
| JP | 2007219106 A | 8/2007 |

(Continued)

OTHER PUBLICATIONS

Saarikko, P., "Diffractive exit-pupil expander with a large field of view", Photonics in Multimedia II, vol. 7001, 2008.

*Primary Examiner* — Arnel C Lavarias
(74) *Attorney, Agent, or Firm* — Seppo Laine Oy

(57) ABSTRACT

An optical see-through display element and a display device using such an element. The element having a transparent substrate including two opposite faces, an in-coupling structure for coupling light into the substrate, and a diffractive out-coupling grating structure arranged on the transparent substrate for displaying the in-coupled light on the transparent substrate. The diffractive out-coupling structure includes at least two multi-layer gratings superimposed on top of each other on at least one of said opposite faces of the substrate. In particular, multilayer gratings reducing diffraction of transmissive light can be used. The element and device help to increase the out-coupling efficiency of diffractive displays and provides also technology to simultaneously maintain high image quality and transparency.

23 Claims, 10 Drawing Sheets

(52) U.S. Cl.
CPC .............. *G02B 6/00* (2013.01); *G02B 6/0016* (2013.01); *G02B 6/0038* (2013.01); *G02B 27/0081* (2013.01); *G02B 27/0103* (2013.01); *G02B 2027/0107* (2013.01); *G02B 2027/0116* (2013.01); *G02B 2027/0118* (2013.01); *G02B 2027/0123* (2013.01); *G02B 2027/0178* (2013.01)

(58) Field of Classification Search
CPC .... G02B 5/1842; G02B 5/1866; G02B 27/01; G02B 27/0101; G02B 27/0103; G02B 27/0105; G02B 2027/0118; G02B 2027/012; G02B 2027/0121; G02B 27/017; G02B 27/0172; G02B 2027/0174; G02B 2027/0192; G02B 2027/0194; G02B 27/42; G02B 27/4227; G02B 27/4272; G02B 27/4288; G02B 27/44
USPC ....... 359/558, 566, 569, 570, 573, 574, 575, 359/576, 113, 618, 630
See application file for complete search history.

(56) References Cited

U.S. PATENT DOCUMENTS

| | | | |
|---|---|---|---|
| 7,215,850 B2 * | 5/2007 | Maisenhoelder | .... G01N 21/552 385/37 |
| 8,233,204 B1 | 7/2012 | Robbins et al. | |
| 8,548,290 B2 * | 10/2013 | Travers | .............. G02B 27/0081 359/34 |
| 2006/0126179 A1 | 6/2006 | Levola | |
| 2006/0228073 A1 | 10/2006 | Mukawa et al. | |
| 2007/0188837 A1 * | 8/2007 | Shimizu | ................. G02B 5/203 359/13 |
| 2009/0245730 A1 | 10/2009 | Kleemann | |
| 2010/0296163 A1 | 11/2010 | Saarikko | |
| 2012/0218481 A1 | 8/2012 | Popovich et al. | |
| 2013/0051730 A1 | 2/2013 | Travers et al. | |
| 2016/0216416 A1 * | 7/2016 | Tekolste | .............. G02B 5/1852 |

FOREIGN PATENT DOCUMENTS

| | | |
|---|---|---|
| JP | 2008058777 A | 3/2008 |
| JP | 2009186794 A | 8/2009 |
| WO | WO9952002 A1 | 10/1999 |
| WO | WO2005093493 A1 | 10/2005 |
| WO | WO2006064301 A1 | 6/2006 |
| WO | WO2006132614 A1 | 12/2006 |
| WO | WO2009077802 A1 | 6/2009 |
| WO | WO2009077803 A1 | 6/2009 |
| WO | WO2011110728 A1 | 9/2011 |
| WO | WO2011113662 A1 | 9/2011 |
| WO | WO2013033274 A1 | 3/2013 |
| WO | WO2014044912 A1 | 3/2014 |

* cited by examiner

OPTICAL SEE-THROUGH DISPLAY ELEMENT AND DEVICE UTILIZING SUCH ELEMENT

FIELD OF THE INVENTION

The invention relates to optical devices. In particular, the invention relates to see-through display elements that can be used in head-up displays (HUDs), near-to-eye displays (NEDs), head-mounted displays (HMDs) and so-called augmented reality glasses or smart glasses, for example.

BACKGROUND OF THE INVENTION

See-through displays comprise three fundamental parts: an image projector, a computing unit controlling the projector, and an optical combiner which is adapted to show the image from the projector to a see-through display, which allows the user of the display to see both the scenery behind the display and the projected image without requiring the user to look away from his usual viewpoint. In a diffractive grating based see-through display solutions image is coupled from an in-coupling grating into a waveguide. From the waveguide the image is coupled out to the eye of a user by an out-coupling grating. Several examples of devices operating with this general principle are introduced in WO 2006/064301, WO 99/52002, WO 2009/077802, WO 2009/077803, WO 2011/110728 and US 2009/0245730. Diffractive gratings are sometimes referred to as holographic optical elements (HOEs).

In some solutions, two or more gratings are used to diffract different wavelengths, serving as so-called multiplex diffraction gratings. For example, WO 2011/113662 discloses a diffractive combiner for a color head-up display device. The device includes a first optical diffraction grating adapted for diffracting, in a diffraction direction, light having a first wavelength and which is incident on the first grating in an incidence direction, a second optical diffraction grating adapted for diffracting, in the same direction, light having a second wavelength and which is incident on the second grating in the incidence direction. The first and second optical diffraction gratings are formed as reliefs on first and second opposite surfaces of the combiner.

In some solutions, there is a plurality of gratings with different orientations. For example U.S. Pat. No. 4,856,869 discloses a display element including a substrate and a display pattern formed on the substrate, the display pattern having a first diffraction grating structure and a second diffraction grating structure. The direction of the grating lines of the first diffraction grating structure differs from that of the grating lines of the second diffraction grating structure, thereby aiming at preventing the occurrence of a rainbow-like effect in the image.

A more efficient solution for preventing the rainbow effect is disclosed in WO 2014/044912. It is based on reducing the amount of light diffracted to non-zero transmission orders from the grating using first and second grating layers comprising periodically alternating zones having different refractive indices. To achieve this, the zones of the first grating layer having higher refractive index are at least partly aligned with the zones of the second grating layer having lower refractive index and vice versa. As a result, the diffraction of transmissive light is decreased. This solution suffers from lower out-coupling efficiency compared with solutions with a single grating per wavelength.

Besides the out-coupling efficiency, another important factor in see-through displays is the transparency of the out-coupling grating. In particular, in wearable displays, such as head-mounted displays (HMDs), the grating is close to the eye and low transparency reduces the brightness of the scenery behind the display. WO 2014/044912, discloses a solution which utilizes a thin metallic layer in the out-coupling grating structure for boosting out-coupling efficiency. This metallic layer, however, decreases the transparency of the grating. A loss of transparency highly affects the user experience and limits or prevents the use of the device in detailed work and driving of a car, for example. Also a darker area over the eye results in a less consumer attractive look of the device.

There is also a plurality of other kinds of diffractive gratings designed for various purposes. For example, WO 2006/132614 discloses a device comprising in-coupling and out-coupling diffractive gratings. There is also an intermediate diffraction grating arranged laterally with respect to the in- and out-coupling gratings in an angle so as to couple diffracted light component from in-coupling grating to the out-coupling grating.

An article by Saarikko P., *Diffractive exit-pupil expander with a large field of view*, Photonics in Multimedia II (2008), Volume 7001, discloses a concept of asymmetric exit-pupil expansion for head-worn virtual displays. US 2010/296163 presents a related apparatus and method for providing a wide field-of-view as well as illumination uniformity in exit pupil expanders (EPE) using stacked EPE substrates with non-symmetric exit pupil expansion that use a plurality of diffractive elements for expanding the exit pupil of a display for viewing. The solution aims at high field of view (FOV) and illumination uniformity.

In diffractive display elements based on light-guides that have a uniform out-coupling grating, the brightness of out-coupled light decreases towards the rear end of the light-guide. Attempted solutions to his problem include trying to provide an out-coupling efficiency that increases towards a rear end of a light-guide. Fabrication of grating profiles with a changing grating depth is however challenging and expensive.

To summarize, in the prior art available, there are solutions with gratings on top of each other for the purposes of improving the response of the devices to different wavelengths and preventing the occurrence of a rainbow-like effect in the image. None of the publications, however, provide as high brightness uniformity and white balance for the image to be displayed and/or as high transparency for the through-coming light and/or as small side effects, such as rainbow effect or other kind of deterioration of image quality, as would be desirable.

Thus, there is a need for improved see-though displays.

SUMMARY OF THE INVENTION

It is an aim of the invention to provide a see-through optical display element, i.e. combiner element, which has an increased coupling efficiency for the image displayed on the display. A further aim is to combine this advantage with minor side effects and a high image quality.

A further aim of this invention is to provide a multilayer grating structure with spatially varying out-coupling efficiency. An advantage of the structure is that it can be manufactured by stacking gratings with uniform grating profiles on top of each other. The size and location of grating areas varies from a layer to another.

Display elements with an out-coupling grating typically also suffer from low white balance over the entire field of view. One aim of this invention is to provide a multilayer grating structure that enhance the white balance of the image displayed. The grating structure consist of a base grating layer that covers the entire out-coupling region and additional grating layers that boost out-coupling efficiency of missing colors in the field of viewpoints having low white balance.

It is an additional aim of the invention to provide a see-through display element, the out-coupling grating of which has an increased see-through transparency, or at least the same level of transparency with known diffraction grating based solutions.

A particular aim is to provide a display element which is suitable for personal wearable display devices, such as smart glasses, and/or for displays integrated in vehicles at the like, such as head-up displays (HUDs).

A still another aim is to provide a display element with out-coupling grating structure which can be conveniently manufactured by nanoimprinting technology, for example.

It is also an aim to provide a display device comprising an element having one or more of the abovementioned benefits.

The invention is based on providing a substrate with multiple out-coupling gratings on top of each other so as to increase the out-coupling efficiency of the element for the light in-coupled to the substrate. Each of the out-coupling gratings has a multilayer structure, which may serve to minimize undesired diffraction behavior, such as diffraction of the light coming through the element (transmissive light), and/or to increase overall transparency of the element, for example. In particular, the multilayer gratings are such that they do not substantially diffract transmissive light, i.e., where the layers interact so as to minimize diffraction to non-zero diffraction orders. In-coupling of light to the substrate can take place using a diffractive in-coupling grating arranged on or within the substrate, or for example using a prism.

Thus, the present optical display element comprises a transparent substrate comprising two opposite faces, an in-coupling structure for coupling a pattern of light into the substrate, and a diffractive out-coupling grating structure arranged on the transparent substrate for coupling the in-coupled light out from the transparent substrate, thereby displaying an image defined by the in-coupled light pattern on the display element. The diffractive out-coupling structure comprises at least two multi-layer gratings superimposed on top of each other on at least one of said opposite faces of the substrate. There may be one or more single-layer or more preferably multilayer gratings on the other face as well.

The present optical display device comprises an element of the abovementioned kind and an image projector capable of directing an image to be displayed on the display element to the in-coupling structure.

More specifically, the invention is characterized by what is stated in the independent claims.

The invention provides considerable advantages. First, each multilayer grating produced out-couples light and overall optical performance is increased through improved out-coupling efficiency. This is made possible by using multilayer gratings as the basic diffractive units. In a preferred embodiment, the multilayer gratings are such that the layers co-operate so as to reduce diffraction to non-zero diffraction orders compared with any of the layers alone. Such multilayer gratings are discussed in WO 2014/044912. It was found by the inventors that unlike conventional gratings, such gratings can be stacked on top of each other without undesired side effects and with a surprisingly high boosting effect on efficiency. That is, each multilayer grating contributes to coupling light from the substrate towards the eye of the user of the device. Conventional out-coupling gratings cannot be used on top of each other due to the fact that they diffract transmitted light. Diffraction of transmitted light produces rainbow effects and ghost images that reduce the image quality of the out-coupled image unacceptably much. The present invention uses gratings on top of each other without significantly affecting the image quality.

It should be noted that boosting the out-coupling efficiency of the combiner element greatly reduces the power requirements of the light source unit. In wearable technology, this is directly related to battery lifetime.

Particular advantages are gained when metal oxide is used as grating layer material in one or more of the multilayer gratings of the out-coupling grating. Metal oxides, such as titanium dioxide $TiO_2$, has a high refractive index and contributes strongly to diffraction while still maintaining high transparency, close to 100%, of the grating structure for transmissive light. A thin layer of 10-150 nm, for example, is sufficient. Entirely metallic layers even with thickness of 10 nm provide considerably lower transparency.

Improved transparency of a grating is a key benefit when there are a plurality of gratings stacked on top of each other, as otherwise the intensity of ambient light coming through the stack would drop unacceptably much when passing the stack. In the present invention, there may be e.g. 2-6 gratings or even more Minimizing intensity losses is important at least in demanding applications, such as in wearable devices. In special applications, a certain degree of transparency loss may be however accepted, whereby the use of e.g. metallic layers is not entirely excluded.

Improved transparency allows for the present element to be used as display element in demanding industrial applications and in human-driven vehicles, for example. One remarkable benefit is also that consumer acceptance in wearable electronics applications is potentially higher, as the out-coupling gratings with high transparency are less visible to other people, as the display can potentially resemble a lens of normal eye glasses.

The present optical element can be utilized as the display element in head-mounted displays (HMDs), head-up displays (HUDs) and near-to-eye displays (NEDs), all of which are herein covered by the term "see-through display". In particular it can be used as a part of an aviation industry display device, automotive industry display device, gaming display device, augmented reality display device, smart personal eyewear device (smart glasses) or guided surgery or assembly display device.

The dependent claims are directed to selected embodiments of the invention.

According to some embodiments, the diffractive out-coupling structure comprises at least two multi-layer gratings superimposed on top of each other not only on one side thereof, but on each of the two opposite faces of the substrate.

Typically, the at least two multi-layer gratings are essentially similar to enhance the out-coupling efficiency of the diffractive out-coupling structure for the same wavelengths. Such structure is also easy to manufacture by repeating the same manufacturing steps to make a plurality of identical gratings.

According to some embodiments, the multi-layer gratings are positioned directly on top of each other. Alternatively, there may be a uniform, i.e. non-grated, transparent interface layer between the at least two multi-layer gratings.

According to some embodiments, the diffractive out-coupling structure comprises multi-layer gratings superimposed on top of each other on one side of said substrate in a partially overlapping and stepped manner where the number of grating layers increases towards the rear end of the light-guide. Such multi-layer gratings may also be on both sides of the substrate. Furthermore, the inventive diffractive out-coupling structure may additionally comprise a multi-layer grating structure for increasing the image white balance, and which covers regions having a reduced white balance.

According to some embodiments, the in-coupling structure comprises a diffractive in-coupling grating, which is suitable for both mono- and polychromatic display applications. Alternatively, the in-coupling structure may comprise a prism, which is particularly suitable for monochromatic display applications.

A diffractive in-coupling grating can be arranged on the substrate laterally with respect to the out-coupling grating structure such that diffracted light can travel between the grating structures taking advantage of the wave-guiding properties of the substrate. In a typical solution, no intermediate direction-changing gratings, for example, are used, although these are not excluded either.

According to some embodiments, there is a reflective layer on outer side of the out-coupling grating as seen from the eye of the user to reflect out-coupled light initially directed away from the observer back to the eye. This increases the out-coupling efficiency of the device. The reflective layer is designed to allow ambient light to pass to the eye.

According to some embodiments, the out-coupling grating structure comprises at least one layer of metal oxide, in particular metal dioxide, in addition to some lower refractive index material. These materials together form a periodic grating in at least one sub-layer of one or more multilayer gratings, preferably all of them. In a typical embodiment, the layer of metal dioxide is arranged on a patterned layer of glass or plastic as the lower refractive index material. The patterned layer typically comprises a diffractive periodic pattern of ridges and grooves and the layer of metal dioxide is plated on the patterned layer using a thin-film deposition technique. The out-coupling efficiency of the grating structures typically increases towards the waveguide rear end to obtain uniform image brightness in the eye box of the display.

According to some embodiments, the layers of each of the multilayer gratings interact so as to reduce diffraction to non-zero diffraction orders compared with any of the layers alone. This allows for maintaining image quality as high as possible and side effects, such as the rainbow effect as low as possible. According to a particular embodiment with which this condition is satisfied, each of the multi-layer gratings comprises a first transparent grating layer which further comprises periodically alternating zones having different refractive indices, and a second transparent grating layer located on the first grating layer and also comprising periodically alternating zones having different refractive indices so that the zones of the first grating layer having higher refractive index are at least partly aligned with the zones of the second grating layer having lower refractive index and vice versa. Use of metal oxide as the grating material as mentioned above combined with this particular embodiment is particularly beneficial.

In particular, the out-coupling grating structure comprises nanoimprinted diffractive features, such as ridges and grooves. In a specific embodiment, the out-coupling structure consists of layers nano imprinted on top of each other, said layers comprising at least two optically different materials arranged as periodically alternating zones. In an alternative embodiment, the out-coupling structure comprises a combination of nanoimprinted features and vacuum- or atomic-layer-deposited features.

Definitions

The term "transparent" (e.g. material layer or zone of the display element) refers to such structures where the transmittance at the visual wavelength mid-range 450-650 nm is at least 20%, in particular at least 50%.

The term "diffractive" means being diffractive at least at some sub-range of the whole visual wavelength range of 380-780 nm.

The "substrate" of the element as herein described has two main functions. First, it serves as a wave guide, therefore guiding the light coupled via the in-coupling structure to the out-coupling grating structure that redirects the light towards the user's eye where the final image is formed on the retina Because it is transparent, the user can see through the display objects that are behind it. Second, it physically supports the gratings produced thereon.

By "opposite faces" of the substrate, we mean optically opposite faces, i.e. boundaries of the substrate which the transmissive light ("see-through-light") passes while travelling to the eye of the user of the display element. Although herein illustrated for simplicity as a flat and constant-thickness plate, the substrate may also have for example, a curved shape, variable thickness, or even one or more internal minors or prisms, which entirely change the direction of light coming though the substrate.

The term "multilayer grating" refers to a grating comprising at least two layers of periodically repeating (periodic) structures, wherein the periods contain at least two material zones with different refractive indices and the layers residing in the surface plane of the substrate. In particular, the term refers to such gratings, where the additional layer (or layers) reduces the amount of light diffracted to non-zero transmission orders, compared with the first layer only, thereby reducing the so-called rainbow effect. As will be discussed later in more detail, the at least two layers forming the multilayer grating may comprise optically different materials or they may be e.g. otherwise similar to each other but shifted half a period with respect to each other. Typically, the layers have the same period. In the present invention, there is a plurality of such multilayer gratings superimposed on top of each other for example by nanoimprinting or stacking technology to improve the overall out-coupling efficiency of the element. The terms "superimposed on top of each other" covers the usual situation, where the multilayer gratings are separated by a uniform interface layer, i.e., the periodic structures are not directly on top of each other but at a distance from each other.

"Nanoimprinting" means printing technology capable of producing diffractive features, in particular gratings (i.e. one- or two-dimensional grids) with dimensions smaller than 1 μm, in particular grids with a period smaller than 100 nm (groove/ridge width smaller than 50 nm) in the lateral dimension and features having a height of 1-1200 nm, preferably using printable materials resulting in polymeric, metallic or metal oxide-containing features.

The term "personal wearable display device" covers in particular head-mounted displays (HMDs) and near-to-eye displays (NEDs), such as smart glasses or augmented reality glasses.

Next, particular embodiments of the invention and advantages thereof are described in more detail with reference to the attached drawings.

DETAILED DESCRIPTION OF EMBODIMENTS

Figure 1A:
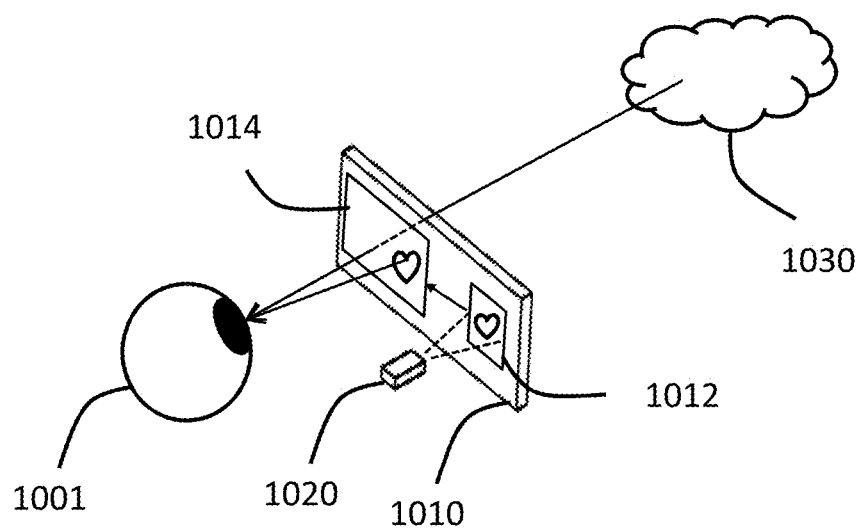
FIG. 1A illustrates the main purpose of use of the present optical display element.

FIG. 1A shows an optical see-through display element 1010 comprising an in-coupling grating 1012 and an out-coupling grating 1014. There is also a projector 1020 directed at the in-coupling grating 1012, which diffracts the incident light to such angles that light propagates in the element 1010 via total internal reflections towards the out-coupling grating 1014. When the diffracted light reach the out-coupling grating 1014, it is diffracted towards the eye of an observer 1001 where the final image pattern is formed on the retina. Simultaneously to seeing the image pattern, the observer sees through the element 1010 any objects 1030 behind it.

Figure 1B:
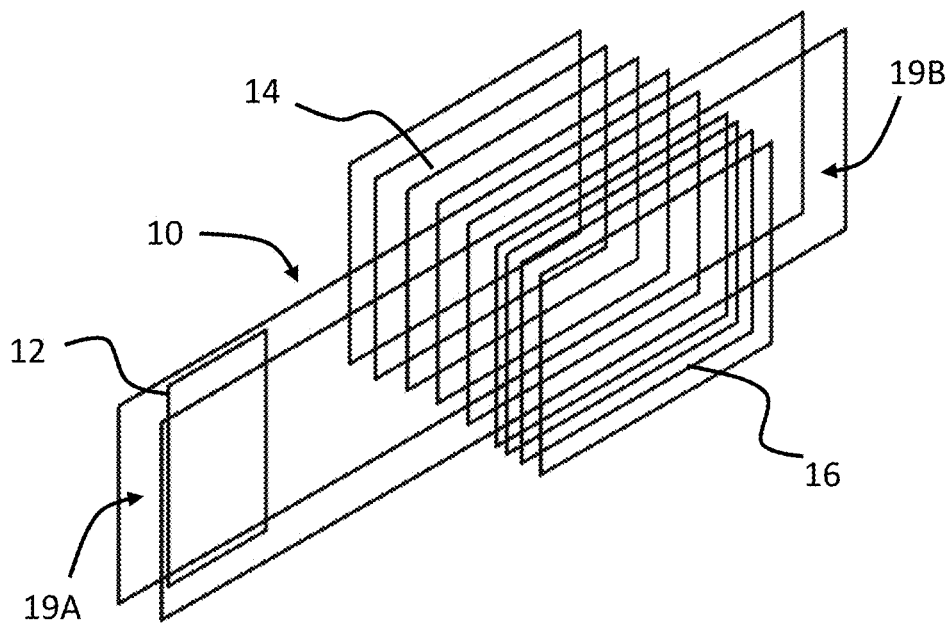
FIG. 1B shows an exploded schematic perspective view of the optical element structure of an embodiment of the invention.

FIG. 1B shows a display element according to one embodiment in more detail. The element comprises a substrate 10 (defined by the large rectangles). The substrate 10 is made of material which can act as a wave guide for at least some wavelengths of visible light, i.e. conduct light within the substrate 10 laterally. The substrate 10 may be planar, as illustrated in FIG. 1B, but may take any other, e.g. curved shape as well. Preferably, the substrate 10 is designed such that light is reflected at its internal boundaries by total internal reflections. There may also be provided mirrors or prisms at one or more boundaries of the substrate 10 to ensure that light remains within the substrate 10 as long as necessary.

The substrate may comprise e.g. glass or polymer, such as polystyrene (PS), polyethylene terephthalate (PET), poly(methyl methacrylate) (PMMA), polycarbonate, cellulose acetate, polyvinylpyrrolidone, or ethylcellulose.

The substrate 10 comprises a light in-coupling zone comprising an in-coupling grating 12 at a plane parallel to the plane of the substrate. The in-coupling grating 12 can be provided within the substrate 10, as illustrated, one or both surface thereof, or both/all of these locations. The in-coupling grating 12 is in optical connection with the substrate 10 such that light directed at the grating 12 is diffracted into the substrate 10 and further guided therein, preferably aided by total internal reflections.

At another lateral position of the substrate with respect to the in-coupling zone, there is a light out-coupling zone. The out-coupling zone comprises a plurality of out-coupling gratings 14, 16 at one or preferably both surfaces thereof. As shown in FIG. 1B, the out-coupling gratings 12, 16 are positioned on top of each other on each side of the substrate 10. There may also be an additional grating within the substrate 10. As discussed later in more detail, each of the out-coupling gratings 14, 16 comprises a multilayer, in particular two-layer, internal structure.

There may be provided mirrors or prisms at longitudinal boundaries 19A, 19B of the substrate 10, where the angle of incident of light in-coupled to the substrate from the in-coupling grating 12 is otherwise too steep for total internal reflections.

Figure 2A:
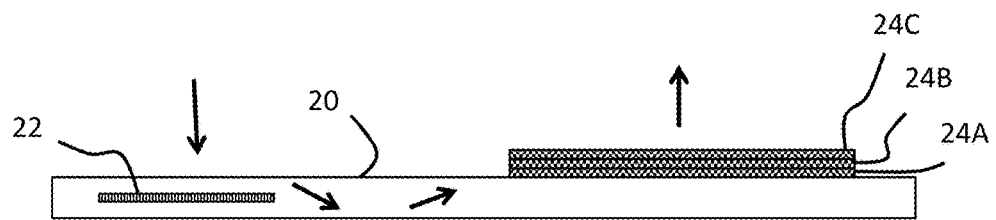
FIGS. 2A-G show cross-sectional views of the structure according to various embodiments of the invention.

FIG. 2A shows the structure of the element according to one embodiment in cross-sectional view. It comprises substrate 20, in-coupling grating 22 within the substrate 20 and three out-coupling gratings 24A, 24B, 24C on a first surface of the substrate 20. The arrows show how light hits, travels within and exists the element due to optical interactions at the gratings and at the boundaries of the substrate.

Figure 2B:
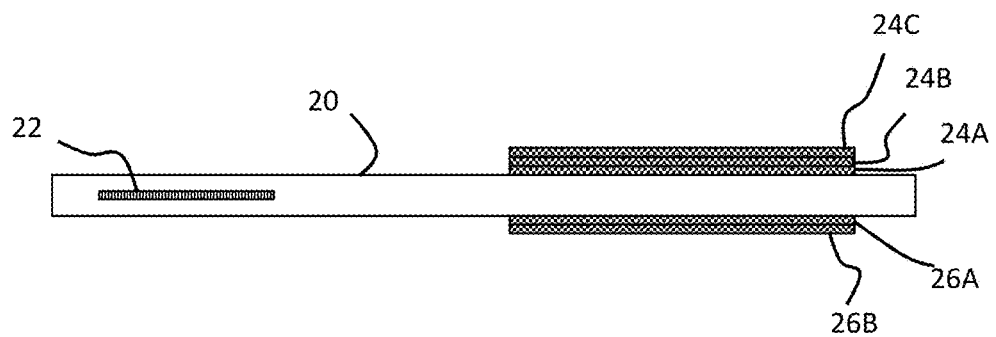

FIG. 2B shows a variation with two additional out-coupling gratings 26A, 26B on the second surface of the substrate 20, aligned with the gratings 24A, 25B, 24B on the first surface. The additional gratings 26A, 26B further add to the out-coupling efficiency.

The number of gratings on top of each other can be e.g. 2-10, in particular 2-5, on each surface of the substrate 20.

Figure 2C:
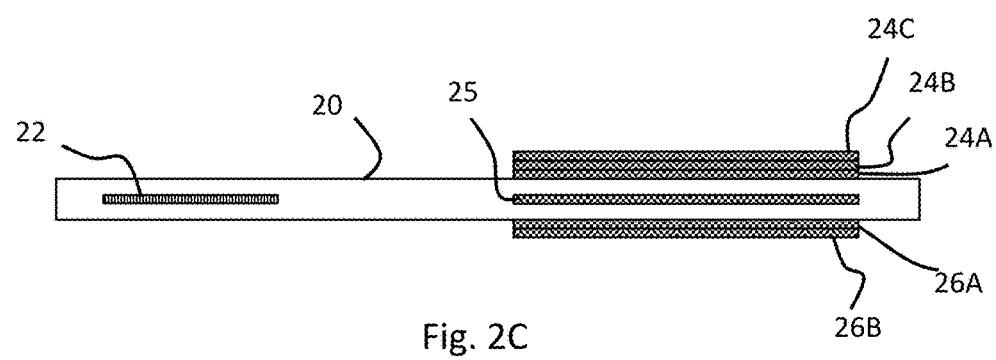

FIG. 2C shows an embodiment with an additional grating 25 embedded within the substrate. Such additional grating 25 also preferably comprises a multilayer structure and can further add to the out-coupling efficiency of the element.

Figure 2D:
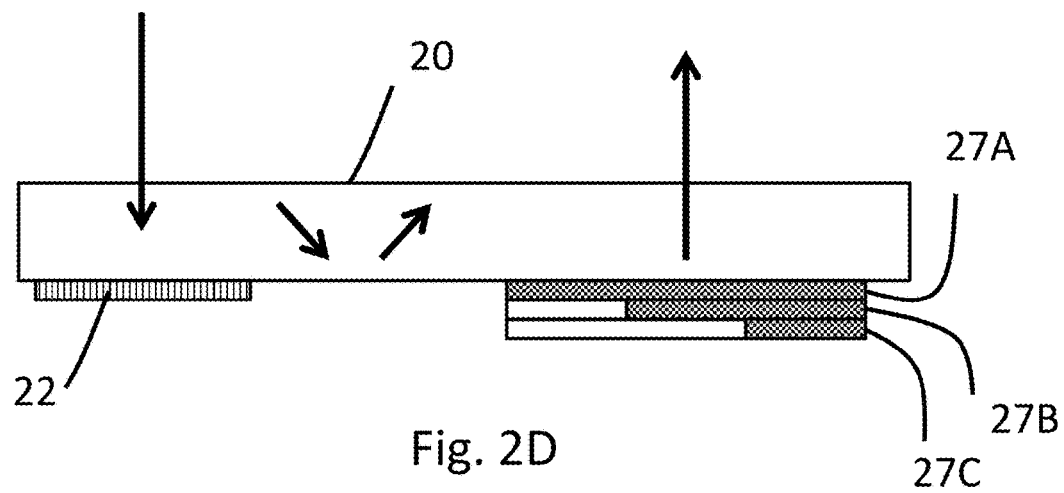

FIG. 2D shows an embodiment with a diffractive out-coupling structure that comprises multi-layer gratings 27A, 27B and 27C superimposed on top of each other on one side of said substrate in a partially overlapping and stepped manner. The number of grating layers increases towards the rear end of the light-guide. The overlapping area of grating layers and consequently the out-coupling efficiency increases towards the rear end of the light-guide.

Figure 2E:
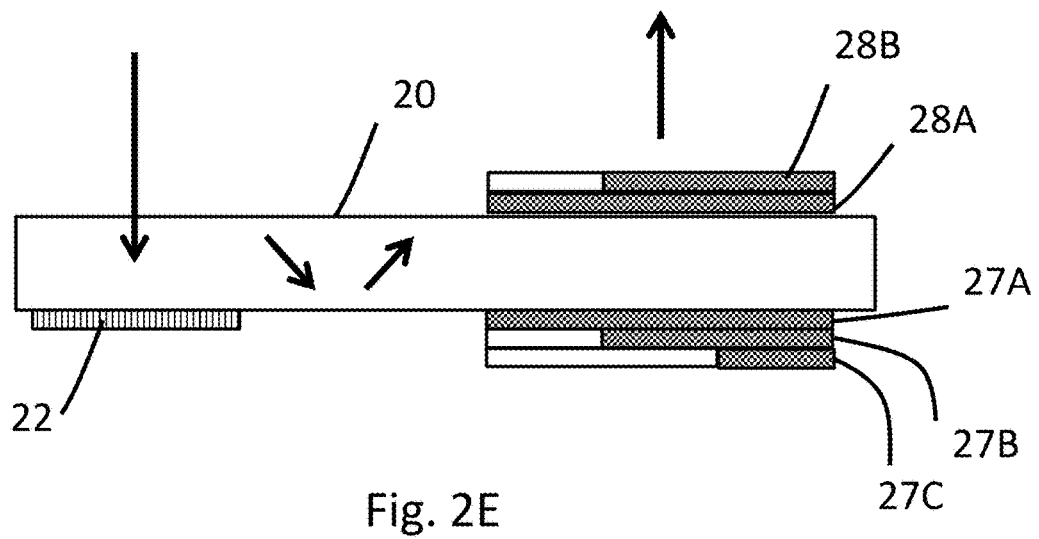

FIG. 2E is otherwise the same as FIG. 2D but it contains partially overlapping out-coupling gratings 28A-B and 27A-C on both sides of the light-guide The partially overlapping grating layers 28A and 28B further enhance the out-coupling efficiency and improve the uniformity of the image brightness in the eye box of the display.

Figure 2F:
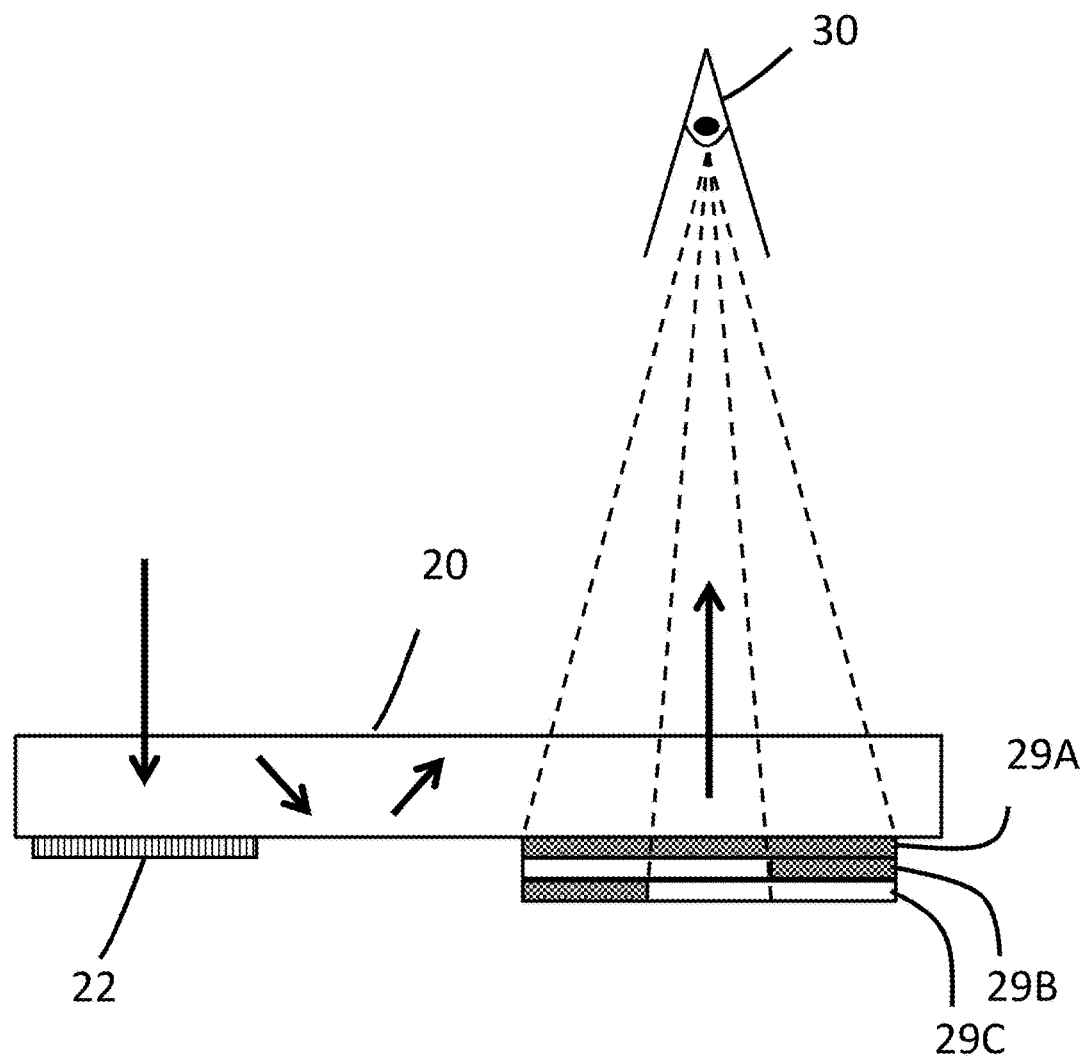

FIG. 2F shows an embodiment in which white balance of the image is increased by using additional multilayer grating structures 29A-C for locally increasing the out-coupling efficiency of spectral color components with reduced brightness to enhance the overall image white balance. The grating 29A covers the entire out-coupling regions while gratings 29B and 29C enhance the out-coupling efficiency of the spectral color components in the field of viewpoints having a reduced white balance. With a fixed eye position (30), there is a clear mapping between field of view points and out-coupling grating areas on the light-guide surface.

Figure 2G:
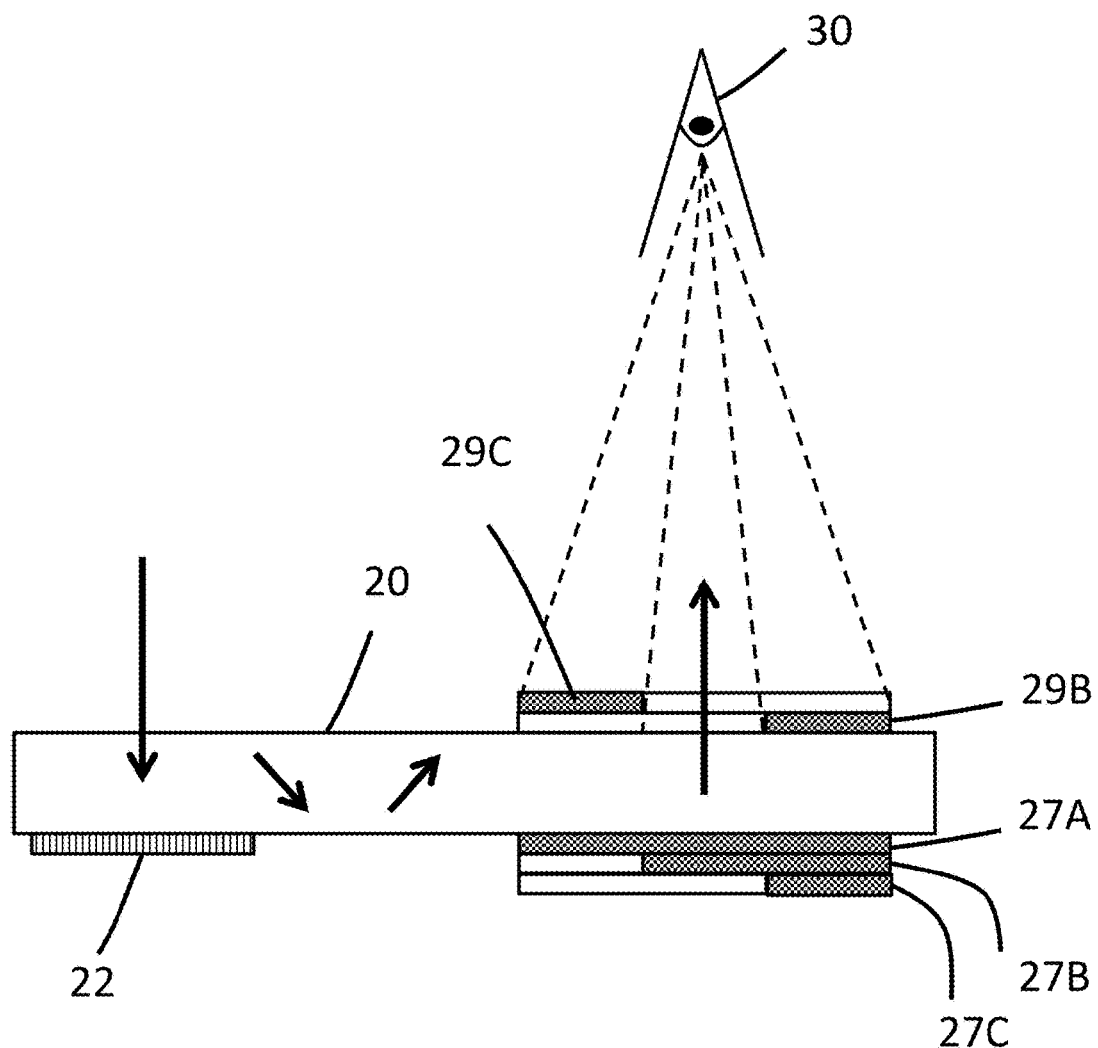

FIG. 2G shows an embodiment that is a combination of embodiments shown in FIGS. 2D and 2F. The grating stack 27A-B out-couples the light so that the out-coupling efficiency increases towards the rear end of the light-guide, while the grating stack 29B, 29C is used to increase the white balance of the displayed image.

Improving Transparency Using Metal Oxide

Figure 3A:
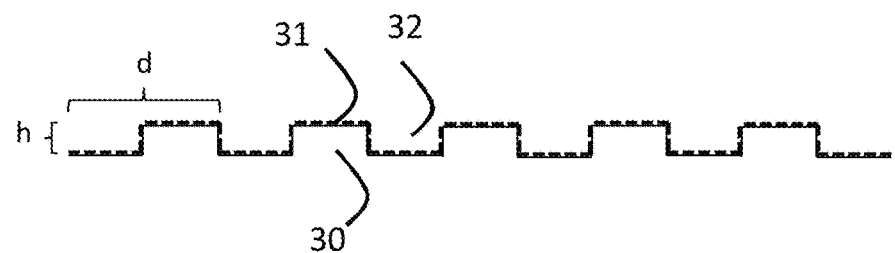
FIG. 3A shows a cross-sectional view of a grating structure with a patterned material layer and a thin-film plating provided thereon.

FIG. 3A shows a multilayer grating comprising a periodically arranged ridges and grooves in first material 30, such as plastic or glass, in order to define a basic grating structure with a period of d and height of h. On top of the ridges and grooves, there is provided a thin layer of second material 31, the second material 31 having a higher refractive index than the first material. Third material 32 with the same or different refractive index than the first material 30 may be provided on top of the structure. This constitutes one example of a multilayer grating usable within the present invention.

Figure 3B:
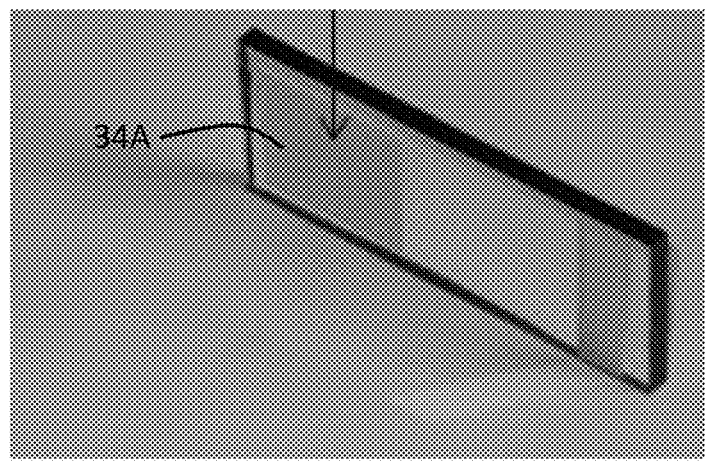
FIGS. 3B and 3C show photographic images of an out-coupling grating according to FIG. 3A, wherein the thin-film plating comprises metal (silver) and metal dioxide, respectively.

FIG. 3B illustrates the transparency of the structure according to FIG. 3A when the second material 31 is silver and the thickness of the silver layer is 10 nm. As can be seen, there is a notable loss of transparency (measured transparency being about 55%) at area 34A comprising the grating compared with non-grated areas around it. Similar behavior is expected with other metals.

Figure 3C:
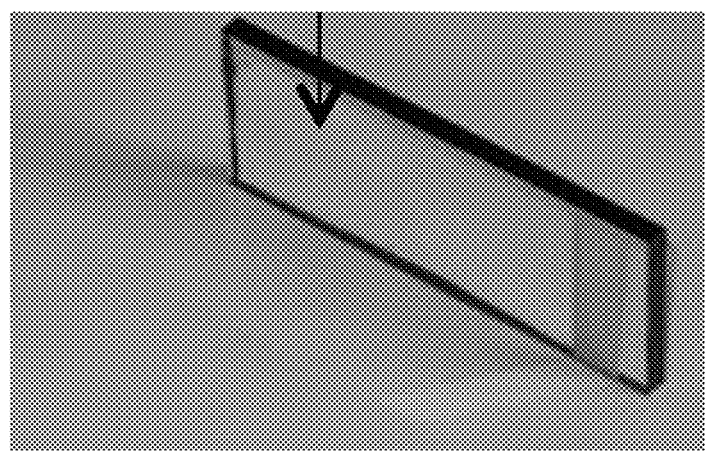

FIG. 3C illustrates the transparency of the structure according to FIG. 3A when the second material 31 is metal oxide, in this case $TiO_2$, the other parameters being the same as in the structure of FIG. 3B. As can be seen, there is no notable loss of transparency (measured transparency being close to 100%). Thus, metal oxide thin layers are more beneficial than metal thin layers, in particular in the present context where there are a plurality of multilayer gratings on top of each other and losses in each single multilayer grating should be as low as possible.

Transparent metal oxide layer can be formed for example using vacuum technologies (evaporation or sputtering), spin coating, atomic layer deposition (ALD) or printing onto a diffractive grating underlaying. The thickness of the layer can be e.g. 1-20 nm, in particular 1-10 nm.

Multilayer Gratings

Next, the structure of exemplary multilayer gratings is discussed in more detail.

According to one embodiment, the multilayer grating comprises a first transparent grating layer which further comprises periodically alternating zones having different refractive indices and a second transparent grating layer located on the first grating layer and also comprising periodically alternating zones having different refractive indices so that the zones of the first grating layer having higher refractive index are at least partly aligned with the zones of the second grating layer having lower refractive index and vice versa. In such structure, the second grating layer reduces the amount of light diffracted to non-zero transmission orders and therefore prevents diffraction of throughcoming light. Preferably, the zones of the first grating layer having higher refractive index are fully aligned with the zones the second grating layer having lower refractive index and vice versa.

In particular, the period, layer thicknesses and refractive indices of the first and second grating layers may be adapted to make the diffraction efficiency of the transmitted orders, in particular the first transmission order, lower than the diffraction efficiency of the reflection orders, in particular the first reflection order, over the wavelength range of 450-650 nm. In one embodiment, the diffraction efficiency of the first transmission order is no more than 0.4% and the diffraction efficiency of the first reflection order at least 3% over the wavelength range of 450-650 nm.

The first and second grating layers have the same grating period and each comprise two types of zones having different refractive indices with a single grating period.

According to one embodiment, the first and second grating layers are of equal thickness. They may also be non-identical in their material properties and have different thicknesses.

In general, the first and second grating layers are periodic in the same direction or directions, i.e., there is no angle between the grating layers.

Figure 4A:
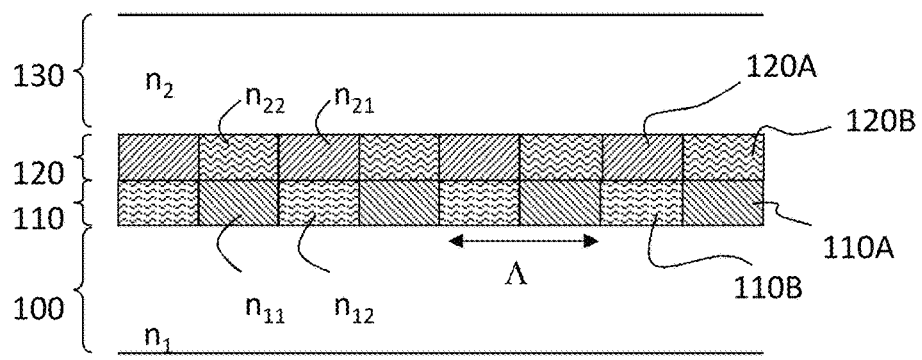
FIGS. 4A-4E show examples of potential multi-layer gratings in cross-sectional views.

FIG. 4A illustrates a general structure of the two-layer grating according to the invention. The grating comprises a first grating layer 110 and a second grating layer 120. The both grating layers have the same grating period (A) and are binary. The first grating layer is composed of a periodic pattern of alternating material zones 110A and 110B having different refractive indices $n_{11}$ and $n_{12}$, respectively. Likewise, the second grating layer is composed of a periodic pattern of alternating material zones 120A and 120B having different refractive indices $n_{21}$ and $n_{22}$, respectively. On the first side of the two-layer grating there is provided a first optically transparent material layer 100 having a refractive index $n_1$ and on the second side of the grating there is provided a second optically transparent material layer 130 having a refractive index $n_2$. The layers 100, 130 on one or both sides of the grating may comprise also air (or vacuum) layers, i.e. lack any solid material.

Figure 4B:
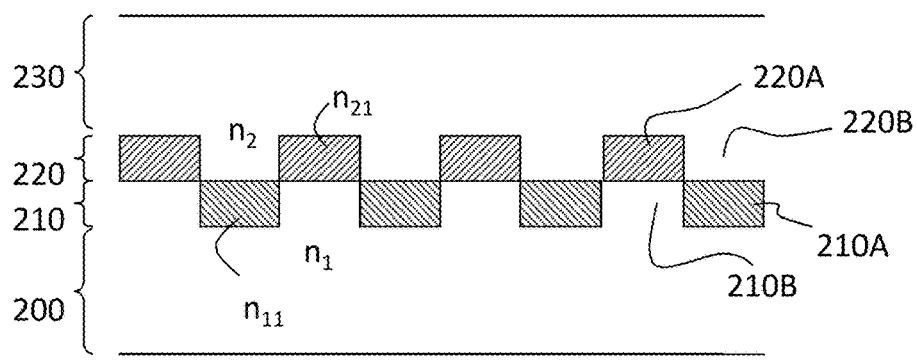

A simplified and practically more feasible structure is shown in FIG. 4B. The structure comprises a first grating layer 210 and a second grating layer 220, like in FIG. 4A. Further, the first grating layer is composed of a periodic pattern of alternating material zones 210A and 210B having different refractive indices $n_{11}$ and $n_1$, respectively. Likewise, the second grating layer is composed of a periodic pattern of alternating material zones 220A and 220B having different refractive indices $n_{21}$ and $n_2$, respectively. The essential difference to FIG. 4A is that the material layers 200, 230 on each side of the grating layers 210, 220 continue seamlessly from the grating zones 210A and 220A, respectively.

At least some of the zones in the first and/or second grating layer may comprise the same material as the substrate or material that has nearly the same refractive index as the substrate. That is, the for example in the context of FIG. 4B, layer 200 or layer 230 may be (part of) the substrate.

Figure 4C:
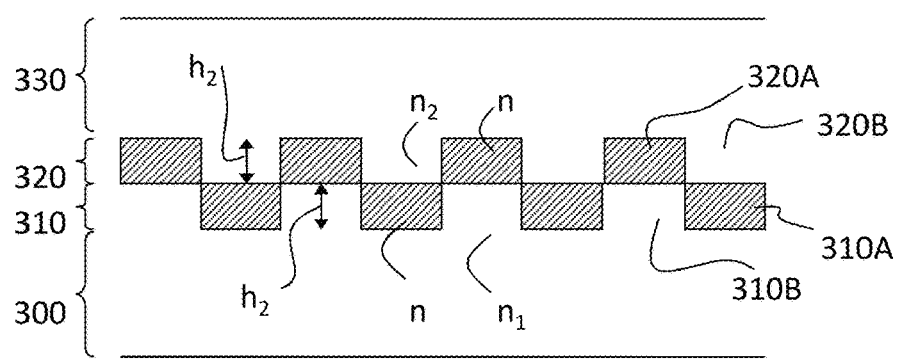

According to one embodiment, at least one, preferably both, of the refractive indices of the second grating layer is the same as in the first grating layer. An example of this is shown in FIG. 4C. The structure comprises a first grating layer 310 and a second grating layer 320, like in FIGS. 4A and 4B. The grating layers are composed of periodic patterns of alternating material zones 310A, 310B; 320A, 320B having different (within each layer) refractive indices n, $n_1$; n, $n_2$, respectively. Also in this embodiment, the material layers 300, 330 on each side of the grating layers 310, 320 continue seamlessly from the grating zones 310A and 320A, respectively. In this configuration, the materials at one zone 310B, 320B of each of the grating layers 310, 320 are the same and therefore the zones 310B, 320B have the same refractive index n.

According to one embodiment, the second grating layer has a similar internal structure as the first grating layer but being laterally shifted by half of the grating period in the periodic direction of the grating. Indeed, It is not excluded that the material zones 310A and 320A of FIG. 4C would also be made of the same material, i.e., that $n_1=n_2$, whereby only two different materials would be needed to make the proposed structure. The same holds for other structures described herein. Similarly, referring back to FIG. 4A, according to one embodiment, the $n_{11}$ zone ($n_{12}$ zone) of the first grating layer has the same refractive index as the $n_{21}$ zone ($n_{22}$ zone) of the second grating layer. This embodiment provides for optimal suppression of the odd transmitted diffraction orders when the grating layers are of equal thickness. If $n_{11} \neq n_{21}$ or $n_{12} \neq n_{22}$, then the optimal suppression may be obtained with grating layers having unequal thicknesses.

Figure 4D:
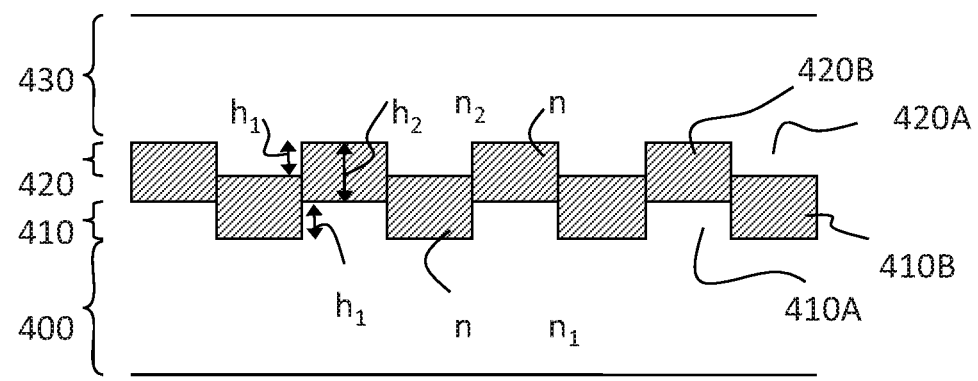

The first and the second grating layer can also be separated by a uniform dielectric layer. An example of such structure is shown in FIG. 4D in which the alternating material zones material zones 410B, 420B overlap each other in the direction normal to the grating. Thus, there is a unified layer of material with refractive index n between the actual grating layers 410, 420. Also in this embodiment, the material layers 400, 430, having refractive indices $n_1$ and $n_2$, respectively, on each side of the grating layers 410, 420 continue seamlessly from the grating zones 410A and 420A, respectively.

Figure 4E:
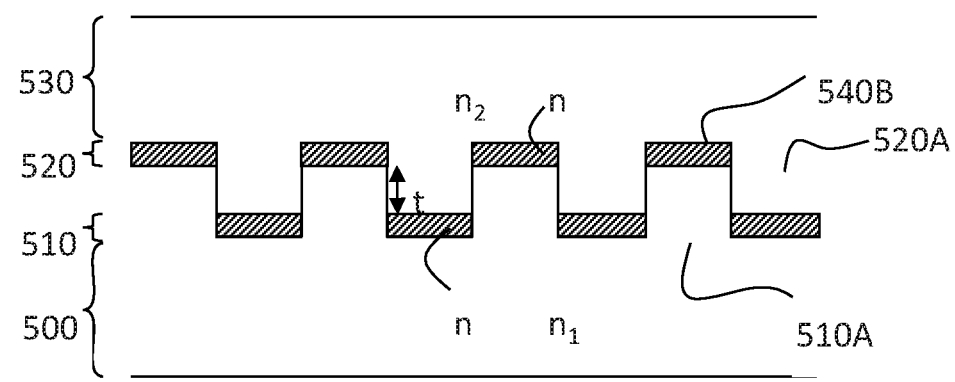

FIG. 4E shows still another embodiment. In this embodiment, the desired double grating is formed by a substrate 500 provided with ridges 510A and having thin layers 540B of metal, or more preferably metal oxide, provided in the bottom of each groove 520A and on each ridge 510A formed between the grooves 520A. On the second side of the structure, there is provided an inversely shaped layer 530, 520A. This layer structure corresponds to that of FIG. 3A. Also shown in FIG. 4E are grating layers 510 and 520.

In all disclosed embodiments the presence of non-periodic interface layers between the multilayer gratings is preferred. There interface layers are preferably uniform, i.e. consist of a single homogeneous material, which can be the same material as that of the substrate. The interface layers can consist of non-periodic layers 100, 130; 200, 230; 300, 330; 400, 430; 500, 530, as in the shown in FIGS. 4A-4E, respectively. An interface layer can therefore consist of the same material as one of the periodic zones of the grating layer adjacent to it, and therefore seamlessly continue from the grating layer.

Figure 5:
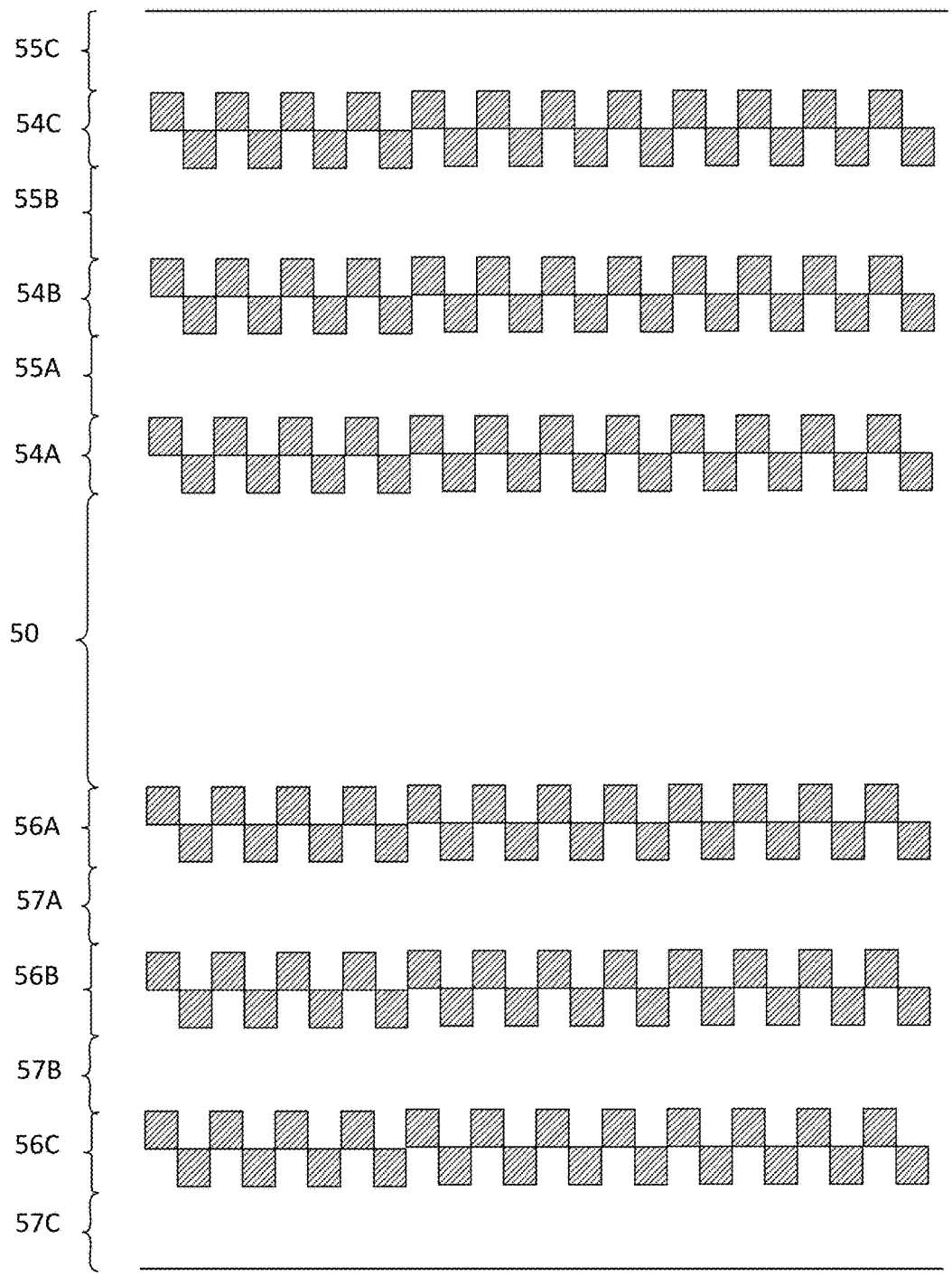
FIG. 5 shows a schematic cross-section of the display element at the location of the out-coupling zone according to an embodiment of the invention.

FIG. 5 illustrates an example of complete out-coupling structure of the element. It comprises a plurality of multilayer gratings 54A-C, 56A-C superimposed on top of each other on both sides of the substrate 50. Between each pair of multilayer gratings 54A, 54B: 54B, 54C; 56A, 56B; 56B, 56C there is a uniform intermediate interface layer 55A; 55B; 57A; 57B, respectively. Further, on the outer sides of the outmost multilayer gratings 54C, 56C, there are provided an outer interface layers 55C, 57C. Herein, each of the multilayer gratings is as shown in FIG. 4C, but thy can have another structure, for example such as shown in any of FIG. 4A, 4B, 4D or 4E. It is preferred, but not mandatory, that the multilayer gratings are mutually similar.

To give some numerical examples, the period of the first and second grating layers can be between 100 nm and 1000 nm, in particular 300 nm and 500 nm, and the layer thicknesses of the first and second grating layers between 1 run and 1000 nm, in particular 10-200 nm. The thickness of the interface layers between two multilayer gratings is typically 2-10 μm.

The lower refractive index in each of the first and second grating layer is typically between 1.3 and 1.8 and the higher refractive index in each of the first and second grating layer between 1.5 and 3.

The disclosed multilayer gratings can be manufactured for example by a) providing an optically transparent bottom substrate having a refractive index $n_1$,
b) manufacturing a sequence of grooves and ridges to the bottom substrate,
c) depositing into the grooves first zones of optically transparent material having a refractive index $n_{11}$ or n to complete the first grating layer,
d) depositing on the ridges second zones of optically transparent material having a refractive index $n_{21}$ or n,
e) depositing between the second zones, and, optionally also on top of the second zones as a uniform coating layer, optically transparent material having a refractive index $n_2$ (which can be but does not need to be equal to $n_1$).

This process can be suitably applied to provide a plurality of multilayer gratings on top of each other either directly or separated by a uniform interface layer.

In the case of the structure of FIG. 4C, the manufacturing steps (c) and (d) can be accomplished by a single deposition. That is, when the grooves of the first grating are filled by a material having refractive index n, the ridge zones of the second grating layer are simultaneously formed.

The grooves and ridges to the substrate may be provided using any known microfabrication technique, such as mechanical engraving, (hot) embossing, laser (e-beam) fabrication, etching or material deposition technique such as nanoimprinting.

Deposition of the material zones of the grating layers with a refractive index different from the substrate and top layer preferably takes place using printing methods, such as gravure, reverse-gravure, flexographic and screen printing, coating methods, spraying methods, or commonly known thin film deposition methods such as thermal evaporation, sputtering and atomic layer deposition.

The topmost layer or any non-periodic interface layer, if present, may be provided by a suitable coating, spraying or printing method.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An optical display element, comprising:
 a transparent substrate comprising two opposite faces,
 an in-coupling structure for coupling light into the substrate, and
 a diffractive out-coupling grating structure arranged on the transparent substrate for coupling the in-coupled light out of the transparent substrate,
wherein
 the diffractive out-coupling structure comprises at least two multi-layer gratings superimposed on top of each other on at least one of said opposite faces of the substrate.

2. The display element according to claim 1, wherein the diffractive out-coupling structure comprises at least two multi-layer gratings superimposed on top of each other on each of said two opposite faces of the substrate.

3. The display element according to claim 1, wherein the diffractive out-coupling structure comprises multi-layer gratings superimposed on top of each other on one side of said substrate in a partially overlapping and stepped manner where the number of grating layers of the multi-layer gratings increases towards a rear end of the diffractive out-coupling structure.

4. The display element according to claim 1, wherein the diffractive out-coupling structure comprises multi-layer gratings superimposed on top of each other on both sides of said substrate in a partially overlapping and stepped manner where the number of grating layers of the multi-layer gratings increases towards a rear end of the diffractive out-coupling structure.

5. The display element according to claim 1, wherein the diffractive out-coupling structure additionally comprises a multilayer grating structure that locally increases an out-coupling efficiency of spectral color components with reduced brightness to enhance the overall image white balance.

6. The display element according to claim 5, wherein the in-coupling grating is arranged on the substrate laterally with respect to the out-coupling grating structure.

7. The display element according to claim 1, wherein the at least two multi-layer gratings are essentially similar.

8. The display element according to claim 1, wherein there is a uniform transparent interface layer between two multi-layer gratings.

9. The display element according to claim 1, wherein the in-coupling structure comprises a diffractive in-coupling grating.

10. The display element according to claim 1, wherein the out-coupling grating structure comprises at least one layer of metal oxide.

11. The display element according to claim 10, wherein said layer of metal oxide is arranged on a patterned layer of glass or plastic.

12. The display element according to claim 11, wherein said patterned layer comprises a diffractive periodic pattern of ridges and grooves and that said layer of metal oxide is plated on the patterned layer.

13. The display element according to claim 10, further comprising a layer of metal oxide in or on each of said multi-layer gratings.

14. The display element according to claim 1, wherein the layers of each of the multilayer grating interact to reduce diffraction to non-zero diffraction orders compared with any of the layers alone.

15. The display element according to claim 1, wherein each of the multi-layer gratings comprises:
 a first transparent grating layer which further comprises periodically alternating zones having different refractive indices, and
 a second transparent grating layer located on the first grating layer and also comprising periodically alternating zones having different refractive indices so that the zones of the first grating layer having higher refractive index are at least partly aligned with the zones of the second grating layer having lower refractive index and vice versa.

16. The display element according to claim 15, wherein at least one of the first or second transparent grating layers comprises a layer of metal oxide forming part of the alternating zones.

17. The display element according to claim 16, wherein the layer of metal oxide has a thickness of 10-150 nm.

18. The display element according to claim 1, wherein the out-coupling grating structure comprises nanoimprinted formations.

19. The display element according to claim 1, wherein the out-coupling structure consists of layers nanoimprinted on top of each other, said layers comprising at least two optically different materials arranged as periodically alternating zones.

20. A see-through display device, comprising:
 an optical display element having:
  a transparent substrate comprising two opposite faces,
  an in-coupling structure for coupling light into the substrate, and
  a diffractive out-coupling grating structure arranged on the transparent substrate for coupling the in-coupled light out of the transparent substrate,
 wherein
  the diffractive out-coupling structure comprises at least two multi-layer gratings superimposed on top of each other on at least one of said opposite faces of the substrate, and
 an image projector capable of directing an image to be displayed on the display element to the in-coupling structure.

21. The see-through display device according to claim 20, further comprising being a head-up display (HUD) or near-to-eye display (NED).

22. The see-through display device according to claim 20, further comprising being a personal wearable display device.

23. The see-through display device according to claim 20, further comprising being smart glasses or augmented reality glasses.

* * * * *

UNITED STATES PATENT AND TRADEMARK OFFICE
CERTIFICATE OF CORRECTION

PATENT NO. : 10,379,358 B2
APPLICATION NO. : 15/561537
DATED : August 13, 2019
INVENTOR(S) : Juuso Olkkonen and Antti Sunnari Page 1 of 1

It is certified that error appears in the above-identified patent and that said Letters Patent is hereby corrected as shown below:

Under Assignee, "Despelix Oy" should be corrected to "Dispelix Oy".

Signed and Sealed this
Seventeenth Day of September, 2019

Andrei Iancu
*Director of the United States Patent and Trademark Office*